United States Patent [19]
Wagner et al.

[11] Patent Number: 5,330,235
[45] Date of Patent: Jul. 19, 1994

[54] ALL PLASTIC QUICK-CONNECT COUPLING

[75] Inventors: Ross L. Wagner, Akron; Gregory Kreczko, Hudson, both of Ohio

[73] Assignee: Swagelok Quick-Connect Co., Hudson, Ohio

[21] Appl. No.: 899,424

[22] Filed: Jun. 16, 1992

Related U.S. Application Data

[63] Continuation-in-part of Ser. No. 531,852, May 31, 1990, Pat. No. 5,123,677.

[51] Int. Cl.[5] ............................................. F16L 35/00
[52] U.S. Cl. ........................... 285/81; 285/320; 285/331; 285/423; 285/921
[58] Field of Search ................ 285/24, 320, 331, 423, 285/921, 81, 82, 84, 85, 86, 87, 88

[56] References Cited

U.S. PATENT DOCUMENTS

| | | |
|---|---|---|
| 147,498 | 2/1874 | Henderson . |
| 418,513 | 12/1889 | Hackley . |
| 1,366,634 | 1/1921 | Clark . |
| 1,922,968 | 8/1933 | Martin .................... 285/88 |
| 2,550,591 | 4/1951 | Parsons . |
| 3,245,703 | 4/1966 | Manly . |
| 3,250,551 | 5/1966 | Draudt . |
| 3,295,869 | 1/1967 | Chambers et al. . |
| 3,602,009 | 8/1971 | Powell . |
| 4,444,419 | 4/1984 | Maeshiba . |
| 4,541,657 | 9/1985 | Smyth . |
| 4,575,133 | 3/1986 | Nattel . |
| 4,591,192 | 5/1986 | Van Exel et al. . |
| 4,775,173 | 10/1988 | Sauer . |
| 4,790,571 | 12/1988 | Montanari .................... 285/86 |
| 4,793,639 | 12/1988 | Glover et al. . |
| 4,804,213 | 2/1989 | Guest . |

*Primary Examiner*—Dave W. Arola
*Attorney, Agent, or Firm*—Fay, Sharpe, Beall, Fagan, Minnich & McKee

[57] ABSTRACT

A coupling assembly entirely formed from plastics material is provided for selectively connecting and disconnecting first and second fluid lines. A male coupling member includes an external groove that receives a radially inward extending shoulder of the sleeve. An external groove on a female coupling member is selectively engaged by latching tabs extending radially inward from the sleeve. The latching tabs are selectively pivoted radially outward through depression of release buttons. The pivoting action of the latching members is defined along a central portion in which circumferential strips undergo a twisting action. A ring may also be provided as an accessory to the coupling assembly for selectively maintaining the male and female members in coupled relation. The ring is adapted for movement between first and second positions. In the first position, movement of the latching tabs is prohibited by the ring. In the second position, the ring does not interfere with the movement of the latching tabs.

20 Claims, 7 Drawing Sheets

ALL PLASTIC QUICK-CONNECT COUPLING

This application is a continuation-in-part application of copending Ser. No. 07/531,852, filed May 31, 1990, and now U.S. Pat. No. 5,123,677 issued on Jun. 23, 1992.

BACKGROUND OF THE INVENTION

This invention pertains to the art of couplings and more particularly to quick-connect/disconnect couplings for fluid lines.

The invention is particularly applicable to a plastic quick-connect coupling, and means for maintaining the first and second coupling members in selectively coupled relation. The coupling member finds application in the biotechnological and biomedical fields and will be described with particular reference thereto. However, it will be appreciated that the invention has broader applications and may be advantageously employed in other environments and applications.

Plastic quick-connect/disconnect couplings are known in the art in which a latching member is selectively pivoted to release and secure male and female coupling members that are connected to first and second fluid lines. Oftentimes, these known coupling assemblies incorporate metal stiffeners to provide rigidity and strength to the latching members that receive the stresses required to move between coupled and uncoupled positions. Otherwise, repeated and continued use of the latching members may result in permanent deformation so that the latch members do not effectively return to their unbiased state. This, in turn, can result in a reduced latching force that can be inadvertently overcome.

When handling biotechnological materials, it is necessary to maintain an ultra-clean environment that will not adversely react with the fluid material. Thus, use of any metal components is avoided. Unfortunately, many of the desired properties of known fluid coupling assemblies are not available in plastic coupling assemblies.

Another goal in designing coupling arrangements is that the latching arrangement be simple and easy to use. In an effort to overcome some of the problems associated with prior plastic quick-connect couplings, manufacturers have designed complex latching arrangements that are difficult to manufacture and use.

Still another concern in the fluid coupling environment is the need to maintain the coupling members in coupled relation and prevent inadvertent uncoupling. Again, complex arrangements are generally known for maintaining coupling members in coupled relation but they are deemed deficient because of complexity, reliability, difficulty in manufacturing, etc.

It would be desirable, therefore, to provide a plastic quick-connect coupling that is easy to manufacture, assemble and use, made entirely of plastic, that provides consistent latching action, and can be selectively maintained in coupled relation.

SUMMARY OF THE INVENTION

The present invention contemplates a new and improved quick-connect assembly that overcomes all of the above referred to problems and others and provides a simple, effective latching arrangement and a means for selectively retaining the assembly in coupled relation.

According to the present invention, the coupling assembly includes male and female members attached to first and second fluid lines, respectively. Each coupling member includes a groove disposed on an external surface thereof. A sleeve member includes a radially inward extending shoulder received in the groove of either the male or female coupling member. A latching member is integrally formed in the sleeve and pivots about its central portion. A latching tab defined at one end of the latching member is selectively received in the groove of the other of the male and female coupling members. The retaining means includes a ring secured to one of the male and female members for selective movement between a first position that maintains the coupling members in coupled relation and a second position allowing the first and second coupling members to uncouple.

According to a more limited aspect of the invention, positioning the ring in the first position precludes pivotal movement of the latch member when the coupling members are coupled together.

According to yet another aspect of the invention, the ring is adapted for rotation between the first and second positions.

According to yet another aspect of the invention, means for positively indicating ring movement between the first and second positions is provided.

A primary advantage of the invention is the ability to effectively maintain the coupling members in coupled relation if desired.

Yet another advantage of the invention resides in the ease of manufacture and operation of the ring.

A still further advantage of the invention is found in the applicability to the bio-tech environment.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Referring now to the drawings wherein the showings are for purposes of illustrating preferred embodiments of the invention only and not for purposes of limiting same, the FIGURES show a coupling assembly A which includes a first or male coupling member B and a second or female coupling member C. A coupling sleeve D is fixedly secured to one of the coupling members, which in the preferred embodiment is the male coupling member, and selectively connects the male and female coupling members together. A lock ring E is incorporated into another preferred embodiment to selectively maintain the male and female coupling members together, and likewise fluid lines F, F' associated with the coupling members.

More particularly, and as shown in FIGS. 1, 2, and 8-12, the male coupling member B is formed entirely of plastic, for example polysulfone. A first end 10 of the male coupling member is adapted for receipt in a first fluid line F which is illustrated in phantom. A second end 12 of the male coupling member is received in the coupling sleeve D and adapted for selective connection with the female coupling member as will be described below. A reduced diameter region 14 and raised land 16 at the first end are adapted to securely receive the first fluid line thereover. An external clamping means (not shown) is used to maintain a secure fit between the first fluid line and the male coupling member in a manner well known in the art. Since the clamping arrangement forms no part of the subject invention, further discussion herein is deemed unnecessary. The coupling member includes a through opening or bore 18 for passage of fluid therethrough. The bore may include valving means (not shown) to selectively shut off fluid flow if desired, particularly when the male and female coupling members are disconnected.

Adjacent the second end of the male coupling member are a radially enlarged shoulder 20 and external groove 22 axially adjacent thereto. The shoulder and groove cooperate with the coupling sleeve to fixedly secure the sleeve and male coupling member together as will be described in further detail below. A second groove 24 is disposed on a reduced diameter portion of the male coupling member at a region between the shoulder and second end. The second groove 24 receives a seal member such as O-ring 26 therein. The O-ring is sized so that its inner diameter closely grips the second groove while its outer diameter, in an uncompressed state, extends radially outward from the second end of the male coupling member. Thus, and as is more apparent in FIG. 2, when the coupling assembly is made up, i.e., couled and latched together, the O-ring radially compresses and axially expands to substantially fill the second groove 24. This assures a fluid tight, secure seal between the male and female coupling members and establishes fluid communication between the fluid lines without leakage at the coupling interface.

The female coupling member includes a first end 30 adapted for receipt in the second fluid line F'. As similarly described with respect to the male coupling member, a reduced diameter region 32 and raised land 34 are adapted to tightly secure the female coupling member in the second fluid line. Again, an external clamping member (not shown) can be used to secure the fluid line to the female coupling member, although other clamping arrangements can be used without departing from the scope and intent of the subject invention.

A second end 36 of the female coupling member includes an enlarged counterbore 38 that is coaxial with throughbore or passage 40. Preferably, the counterbore includes an internally tapered region 42 at its outer end that facilitates receipt of the female coupling member over the external diameter of O-ring 26. The tapered region ramps the female coupling member over the O-ring and facilitates insertion of the second end 12 of the male coupling member therein. An external tapered surface 44 is also provided at the second end of the female coupling member for reasons which will become more apparent below.

Figure 1:
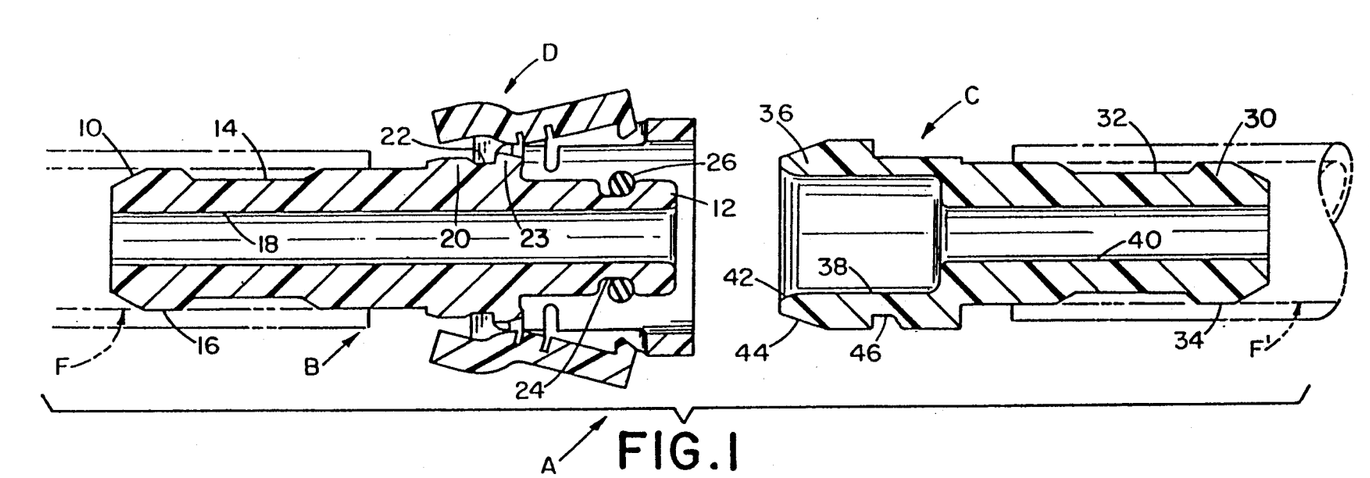
FIG. 1 is a longitudinal cross-sectional view of the coupling components in a disconnected arrangement.
Figure 2:
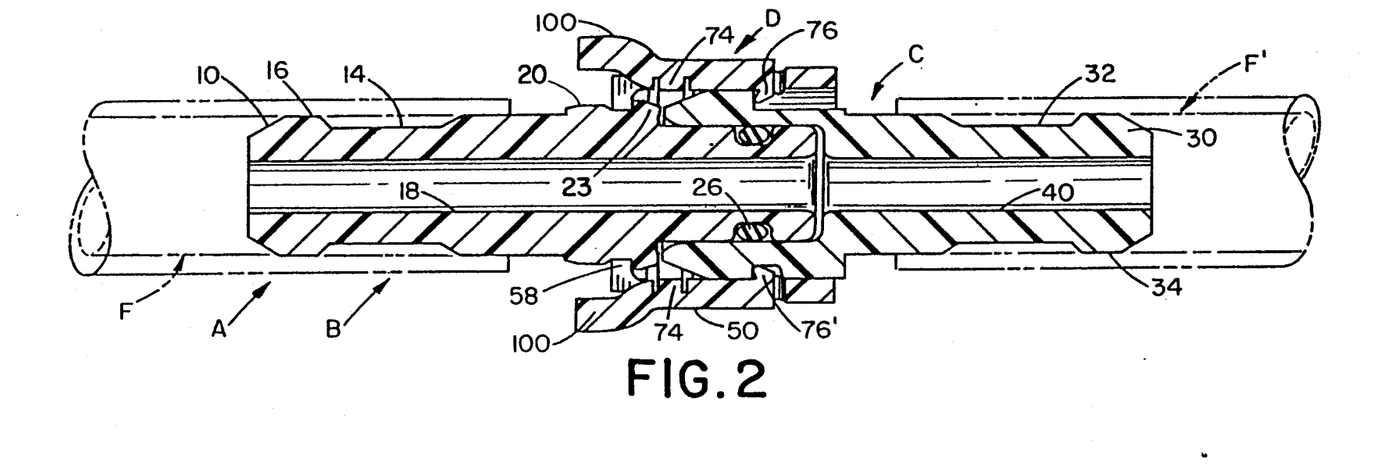
FIG. 2 is a longitudinal cross-sectional view similar to FIG. 1 but illustrating the coupling components in a connected arrangement.

An external groove 46 is defined adjacent the second end of the female coupling member. This external groove facilitates latching connection of the coupling members. As best illustrated in FIG. 2, the groove is axially spaced from the end of the female coupling member so that sealing engagement is first established between the coupling members B, C. Thereafter, and upon further axial advancement of the coupling members from the position shown in FIG. 1 to that shown in FIG. 2, the coupling sleeve engages the groove 46. Fluid communication is then established between the bores 18, With continued reference to FIGS. 1 and 2, and additional reference to FIGS. 3-7, the third component of the basic coupling assembly, namely the coupling sleeve D, will be described in greater detail. It, too, is also formed entirely of plastic, preferably polysulfone. It will be understood, though, that still other alternative plastic materials can be used without departing from the scope and intent of the subject invention.

The coupling sleeve is defined by a substantially cylindrical member 50 having opposed first and second ends thereof. Preferably, the second end 54 is circumferentially continuous to provide added strength to the coupling assembly. The first end 52, on the other hand, has circumferentially interrupted regions for reasons which will be addressed below. The internal diameter 56 of the sleeve is dimensioned to freely, but closely, receive the second end of the female coupling member. Additionally, a radially inward extending shoulder 58, comprised of two substantially semicircular portions that are circumferentially spaced apart, is disposed at the first end 52 of the sleeve. The shoulder has an inner diametrical dimension substantially the same as that of external groove 22 on the male coupling member. In this manner, the sleeve can be inserted over the first end 10 of the male coupling member and advanced axially toward the second end 12 until the shoulder 58 snaps into engagement in groove 22. The shoulder 58 of the coupling sleeve abuts radially outward extending shoulder 23 (FIGS. 8-9) of the male coupling member to limit further axial advancement of the sleeve toward the second end 12.

Figures 5, 6:
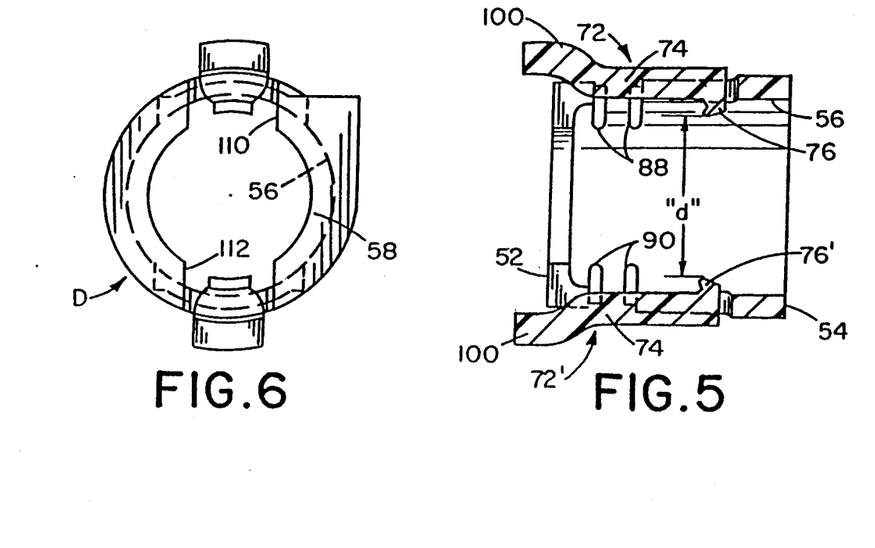
FIG. 5 is a longitudinal cross-sectional view of the coupling sleeve.
FIG. 6 is an end elevational view taken from the left-hand side of FIG. 5.

A means for latching the female coupling member to the male coupling member is integrally defined on the sleeve. More specifically, the latching means is defined by two, diametrically opposed latching members 72, 72'. The latching members are identical in construction so that description of one is applicable to the other unless specifically noted otherwise. The latching member pivots about a generally central portion 74. A latching tab 76 is defined adjacent the second end of the sleeve and extends radially inward so that the dimension "d" defined between the latching tabs 76, 76', in a relaxed position, is substantially less than that of the inner diameter 56 of the sleeve (FIG. 5).

Each latching tab includes a bevelled edge 78 (FIGS. 3 and 8) that cooperates with externally tapered region 44 at the second end of the female coupling member to ride over and snap radially inward into groove 46. That is, as the male and female coupling members are brought into sealing engagement, the latching tabs slide along the tapered region 44 and then snap radially inward into groove 46. This locks the female coupling member against axial movement relative to the male coupling member.

Figure 3:
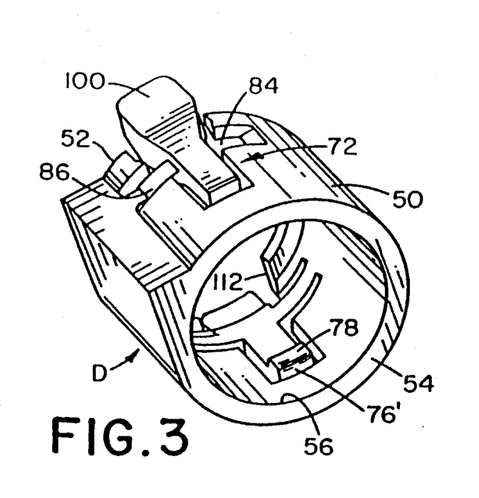
FIG. 3 is a perspective view of the coupling sleeve of the quick-connect assembly.

As the latching tabs slide over the external tapered region 44, the entire latching member pivots about the central portion 74. More specifically, circumferentially extending strips 84, 86 are defined by circumferential slot pairs 88, 90. The strips only extend partially around the circumference of the coupling sleeve as is apparent in FIGS. 3 and 4. One of the circumferential slots 88 intersects longitudinal slot 92 on one side of the strip 84 while the other slot intersects an irregular longitudinal slot 94 that extends to sleeve end 52. Likewise, circumferential slots 90 intersect longitudinal slots 96, 98 on either axial side of the strip 86. According to the preferred arrangement, and as best shown in FIG. 3, the circumferential strips 84, 86 have a substantially reduced thickness or radial dimension relative to the remainder of the sleeve. This provides ideal twisting action with sufficient reinforcement at the areas of intersection of the strips with the rest of the sleeve.

The longitudinal slots 94, 98 extend radially through the cylindrical member 50 at the first end 52 so that an actuating portion or release button 100 can be depressed radially inward relative to the sleeve. Depressing the buttons radially inward pivots the latching tabs 76 radially outward. This pivoting action places the circumferential strips 84, 86 under a twisting load, which is distributed along the strips to prevent plastic deformation of the sleeve material.

The latching member is reinforced along its longitudinal extent and as most apparent in FIGS. 3 and 5. The latching member has increased mass for strength and rigidity purposes so that depression of the release button results in a well defined pivoting action about the central portion 74 and circumferential strips 84, 86 to move the latching tabs to a release position. Once the depression force is released, the memory of the plastic material urges the latching tabs radially inward and the release buttons 100 radially outward to the normal, locked position shown in FIG. 5.

Figure 4:
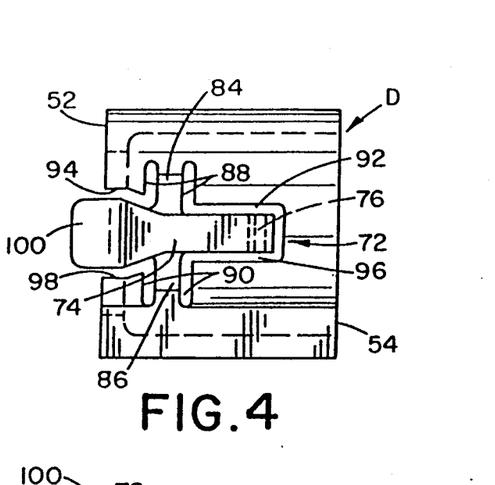
FIG. 4 is a top plan view of the coupling sleeve of FIG. 3.

As is most apparent in FIG. 4, the release button extends axially beyond the end 52 of the sleeve. Preferably the actuating portion also has a substantially larger lateral or circumferential dimension than the remainder of the latching member. This provides sufficient surface area to accommodate an operator's fingers to effectively depress the release buttons and move the latching tabs outward.

Figure 7:
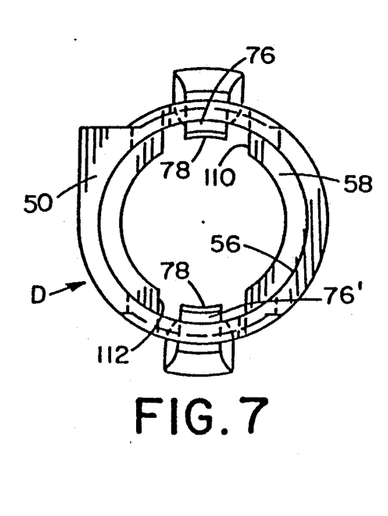
FIG. 7 is an elevational view taken from the right-hand side of FIG. 5.
Figure 8:
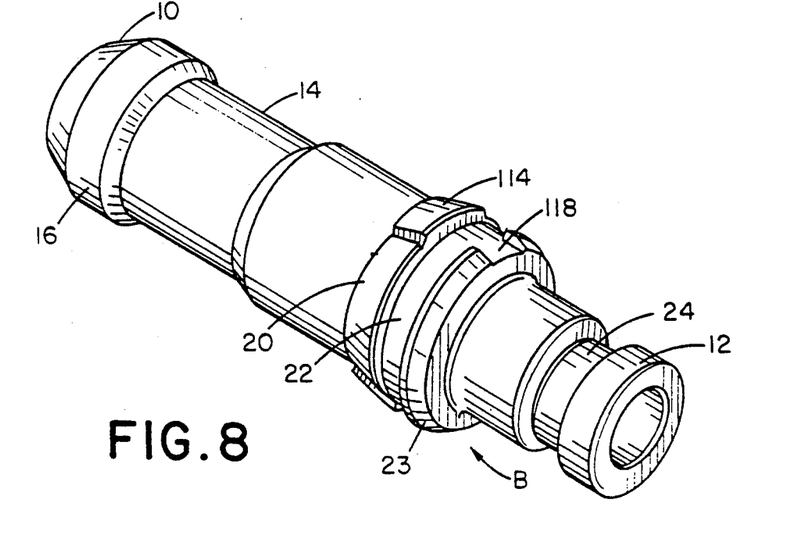
FIG. 8 is a perspective view of the male coupling member
Figure 9:
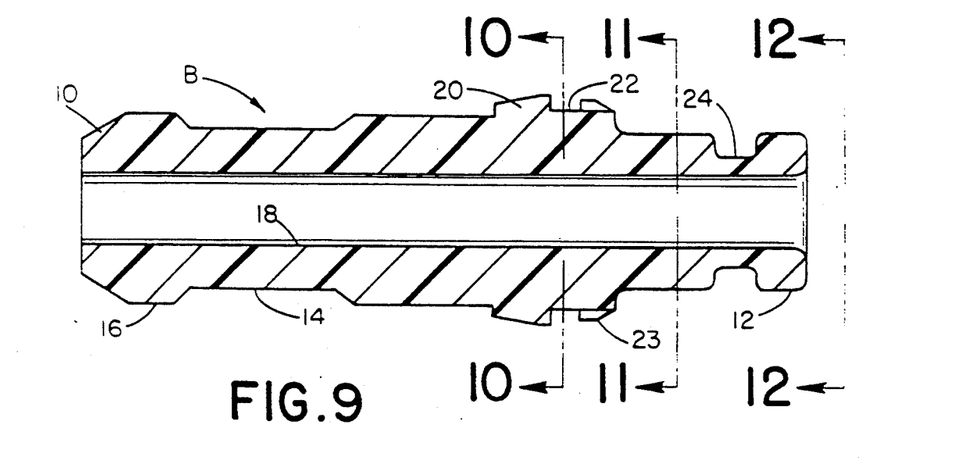
FIG. 9 is a longitudinal cross-sectional view of the male coupling member.
Figure 10:
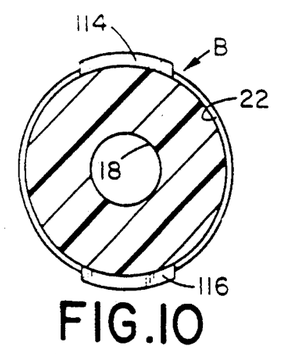
FIG. 10 is a cross-sectional view taken generally along the lines 10—10 of FIG. 9.

As best shown in FIGS. 6 and 7, the shoulder 58 of the sleeve is circumferentially interrupted at diametrically opposite regions 110, 112. These regions cooperate with keyed portions 114, 116 defined by radial flanges on the male coupling member (FIGS. 8 and 10). The lateral or circumferential dimension of these keyed portions is slightly less than the circumferential extent of the regions 110, 112. Thus, when the coupling sleeve is placed over the first end 10 of the male coupling and advanced toward the second end 12, the keyed portions 114, 116 and regions 110, 112 must be aligned to force the sleeve over shoulder 20 of the male coupling member.

Figure 11:
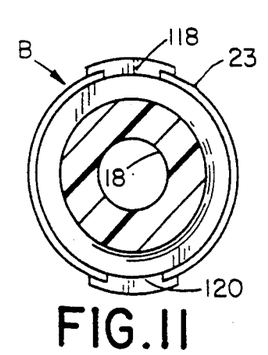
FIG. 11 is a cross-sectional view taken generally along the lines 11—11 of FIG. 9.
Figure 12:
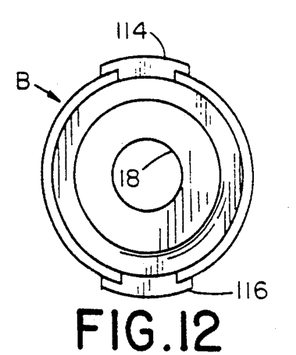
FIG. 12 is an end view of the male coupling member taken generally along the lines 12—12 of FIG. 9.
Figure 13:
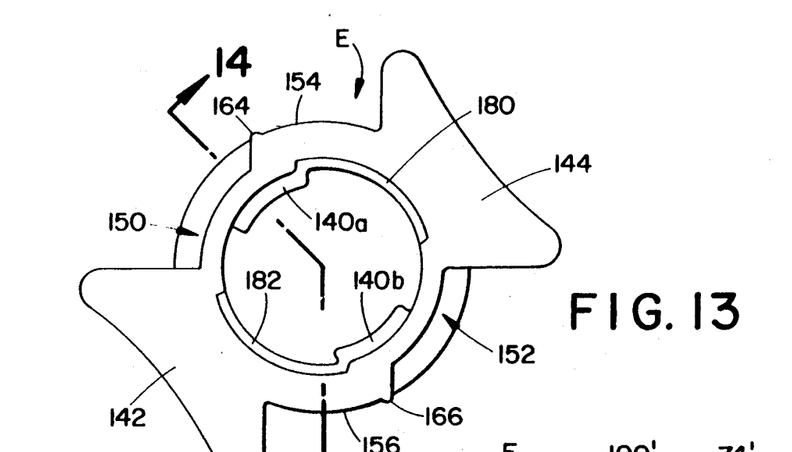
FIG. 13 is an elevational view of a lock ring that may be selectively used with the coupling assembly.

Circumferential recesses 118, 120 are also preferably provided on the male coupling member as illustrated in FIG. 11. The recesses permit the latching members 72, 72', particularly the latching tabs 76, 76', to advance axially past shoulder 25 during assembly of the coupling sleeve over the shoulder 20. Once the coupling sleeve shoulder 58 is received in groove 22, the sleeve is free to rotate relative to the male coupling member and is axially retained between shoulders 22 and 23.

With continued references to FIGS. 1-12, and additional reference to FIGS. 13-19, a modified all plastic quick-connect coupling assembly will now be described. For purposes of brevity, like elements will be referred to by like numerals with a primed suffix (') while new elements will be referenced by a new numeral. Unless described to the contrary, similar elements are substantially structurally and functionally identical to the prior description.

Figure 14:
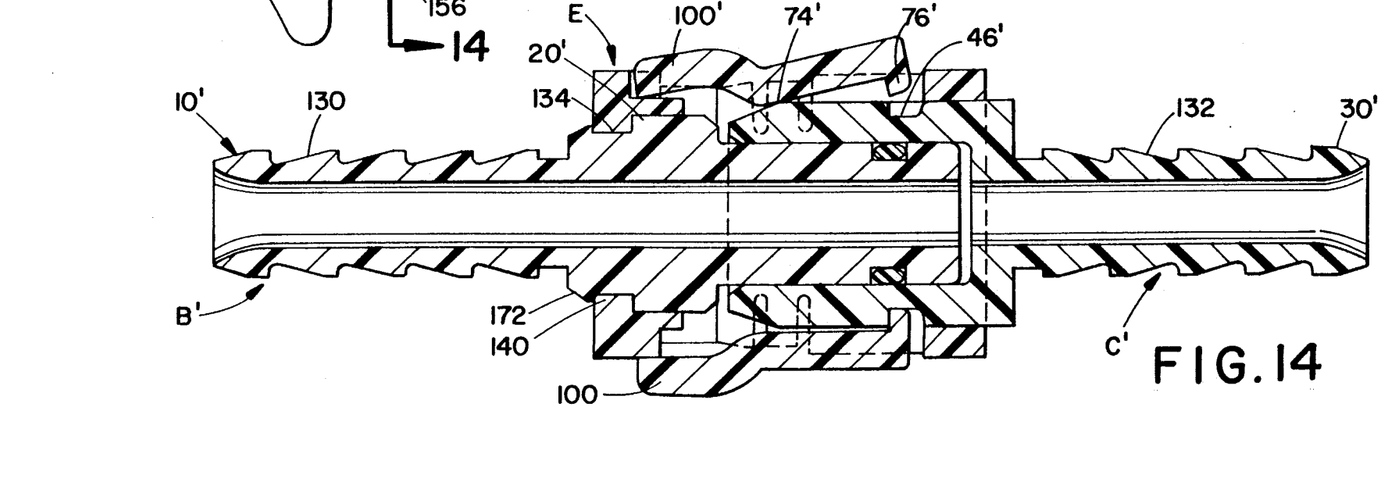
FIG. 14 is a cross-sectional view taken generally along the lines 14—14 of FIG. 13 of the lock ring assembled on the male and female coupling members shown in coupled relation, and illustrating how the lock ring maintains the male and female members in coupled relation and permits pivotal movement of the latching member to uncouple the assembly.

The first end 10' of the first or male coupling member B, is slightly modified as shown in FIG. 14. Specifically, the reduced diameter region and raised land are substituted with a series of axially spaced barbs 130 that cooperate with a fluid line and associated clamp (not shown) in a well known manner. The second or female coupling member C' is also suitably modified to incorporate spaced barbs 132 adjacent its first end 30'.

The male coupling member is further modified by incorporating a groove 134. The groove is axially located between the shoulder 20' and the first end 10' thereof. As shown, it is dimensioned to closely receive a lock ring E, specifically a radially inward extending shoulder 140 thereof. The lock ring is designed as an accessory device where a user desires to maintain the male and female coupling members B', C' in coupled relation. The lock ring is circumferentially continuous so that once axially advanced into position in groove 134, it maintains its position there.

The lock ring includes a pair of enlarged finger engaging portions 142, 144 (FIG. 13) that extend radially outward from the remainder of the ring at diametrically opposite portions. The finger engaging portions allow a user to easily grasp the ring and rotate it between first and second positions (FIG. 15 and FIG. 16) that represent the locked and unlocked rotary positions of the ring, respectively.

The ring includes a pair of recesses 150, 152 that are circumferentially spaced apart. The recesses define radially inward receiving surfaces that provide sufficient clearance for the actuating portions 100' to be received therein so that the latching members can pivot about central portions and allow tabs to be displaced from groove 46' on the female coupling member (upper half of FIG. 14). On the other hand, when the recesses have been rotated approximately 90°, shoulders 154, 156 are positioned beneath the actuating portion 100' and preclude radial inward movement of the actuating portions. In other words, the shoulders 154, 156 selectively interfere with the radial inward movement of the latching members so that the tabs remain in a locked position in groove 46'. This selective interference with the movement of the latching members is easily accommodated since the actuating portions 100' extend axially beyond the end of the coupling sleeve as described above.

To provide a positive indication to a user of the movement of the lock ring A between its first and second positions, detent means 164, 166 extend radially outward from the shoulders 154, 156. The detents are sufficiently raised so as to require a predetermined force to rotate or pass beneath the latching members, particularly the actuating portions 100' thereof. Thus, a positive, tactile feedback is provided when the detents pass beneath the latching members indicating to the user that movement from the first, or second, position to the second, or first, position, respectively, has been fully achieved. The detents also assist in maintaining the lock ring in its selected position and thereby prevent inadvertent rotation.

Figure 15:
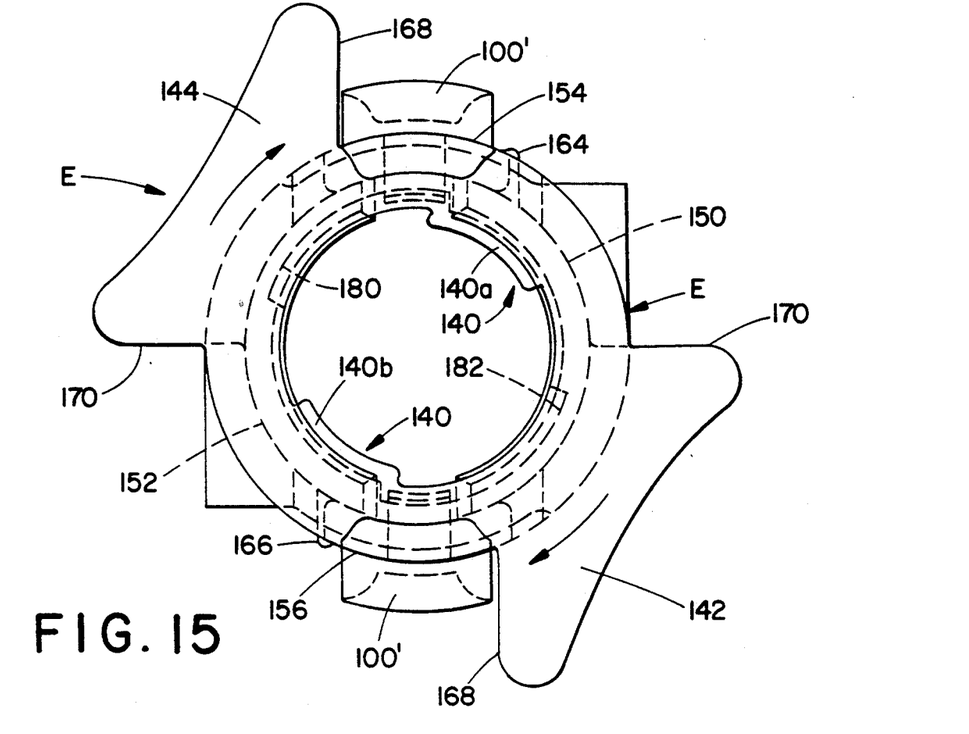
FIG. 15 is an elevational view of the left-hand end of the coupling assembly of FIG. 14 with the ring disposed in a locked, first position.
Figure 16:
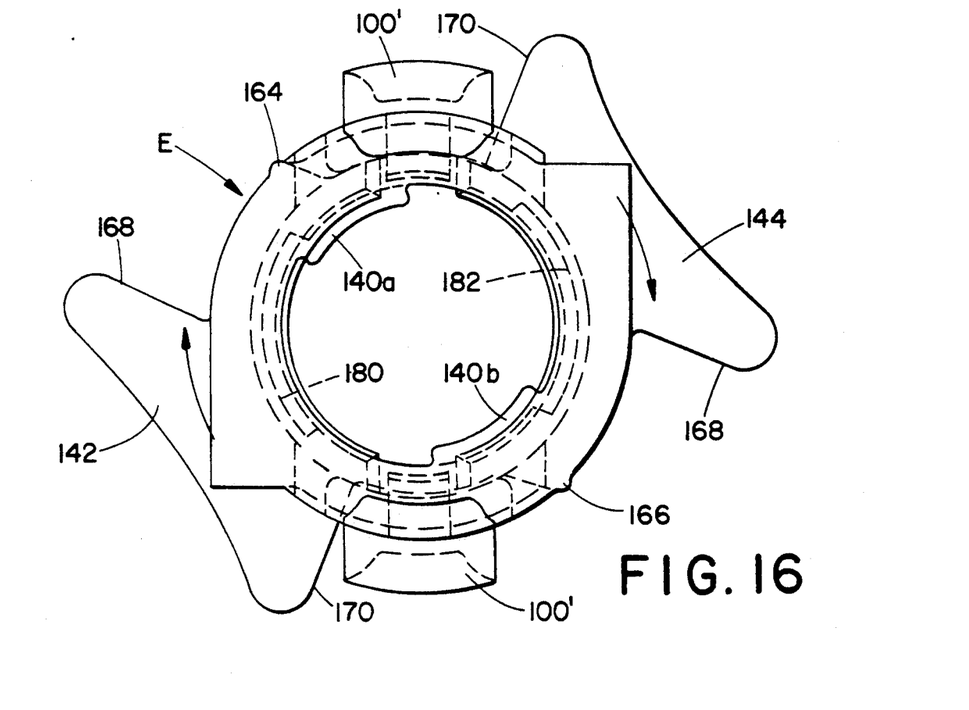
FIG. 16 is an elevational view substantially similar to that of FIG. 15 but illustrating the ring in an unlocked, second position.
Figure 17:
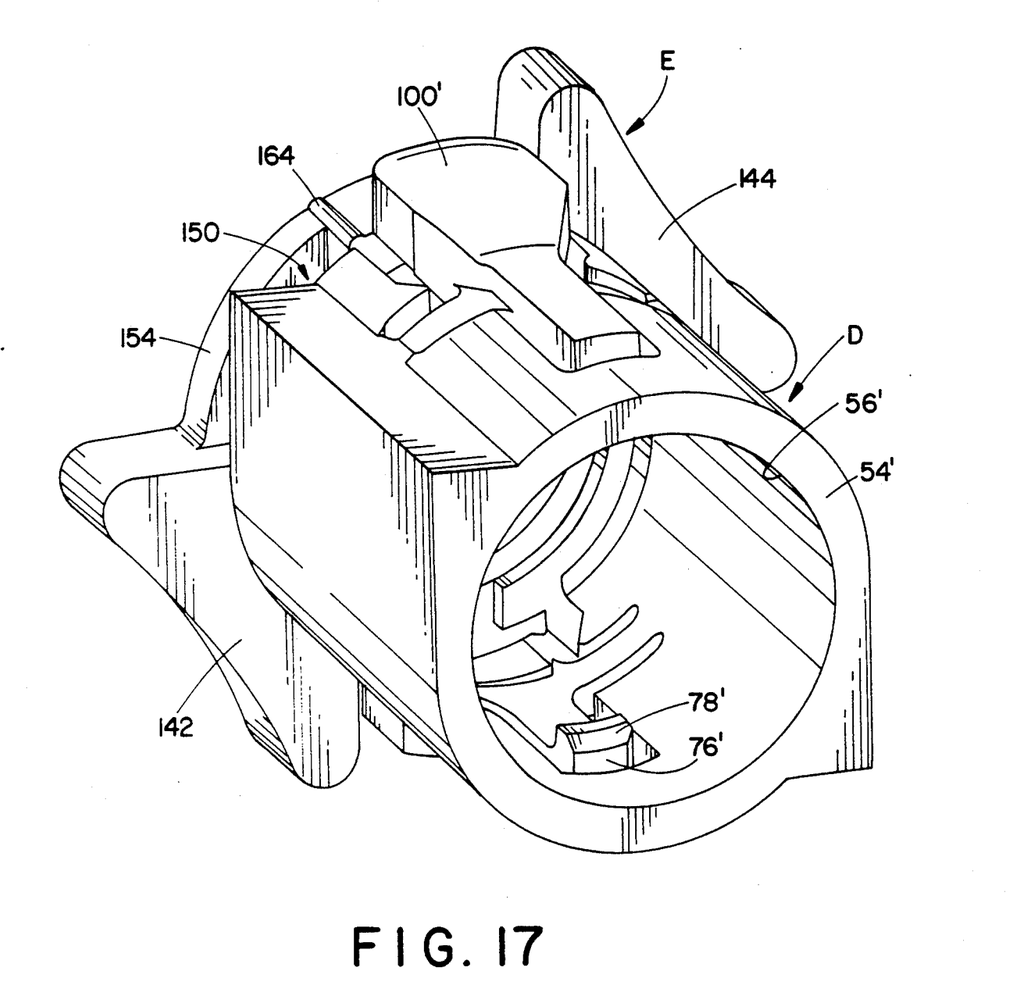
FIG. 17 is a perspective view of the coupling sleeve and the lock ring taken generally from the front, right-hand side thereof.
Figure 18:
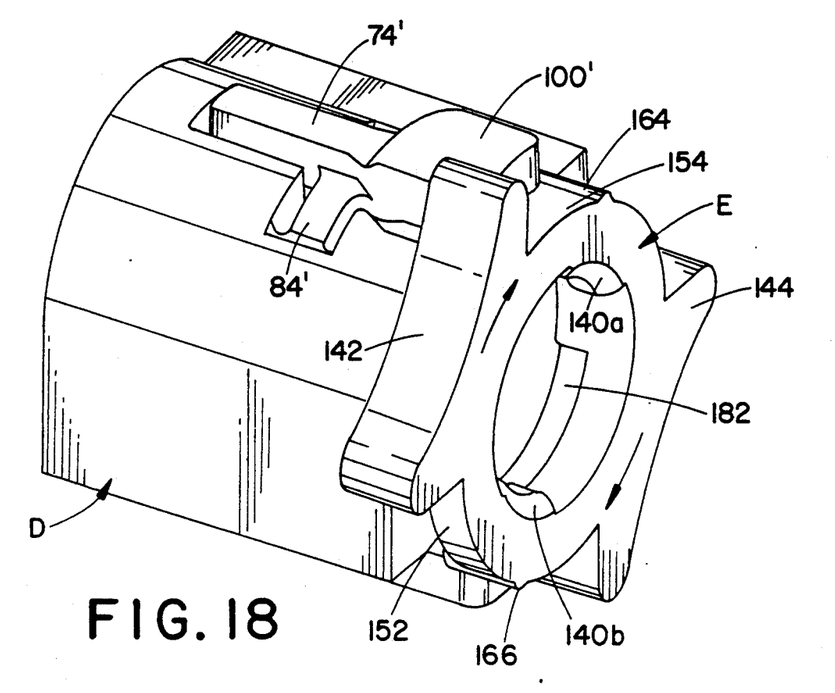
FIG. 18 is another perspective view of the female coupling member and the lock ring taken generally from the rear, left-hand side thereof and showing the ring in the locked, first position.

Additionally, the finger engaging portions 142, 144 each define opposed stop surfaces 168, 170. The stop surfaces 168, 170 abuttingly engage the latching members upon rotation of the lock ring in a clockwise direction as shown in FIG. 15. Thus, after the detents have passed from beneath the latching members, the stop surfaces 168 on each of the finger engaging portions prevents further rotation of the lock ring. Likewise, rotation in the counter-clockwise direction is also limited by engagement of stop surfaces 170 with the latching members (FIG. 16).

As shown in this preferred embodiment, the radially inward extending shoulder 140 is, in fact, defined by two circumferentially spaced portions 140a, 140b. These portions allow the lock ring to be axially advanced over the male member and into engaging receipt with groove 134. Since the portions 140a, 140b only extend over a limited circumferential extent, the central opening through the lock ring can be slightly deformed to adopt a slight elliptical conformation that allows the lock ring to be axially advanced over shoulder 172. Once advanced over the shoulder 172, the lock ring relaxes to its original circular configuration and the portions 140a, 140b are rotatably received in groove 134.

Recesses 180, 182 are also provided on the lock ring to accommodate keyed portions 114, 116 on the male member. The recesses 180, 182 extend radially outward from the through opening of the lock ring and are circumferentially contiguous and axially offset relative to portions 140a, 104b. Although the recesses could be formed as a circumferentially continuous groove, the additional plastic material provided by discontinuous recesses is preferred to add strength to the lock ring.

Another advantageous feature of the all plastic assembly and lock ring arrangement is that if the lock ring is disposed in its first or locked position (FIG. 14, 18), makeup of the separated male and female coupling members can still be achieved. That is, sufficient flexibility is provided in the physical properties of the latching members 72' so that the tabs 76' can ramp or be pushed radially outward by contact with tapered surfaces 44' on the female coupling member, even though the actuating portions 100' are precluded from radial inward movement by shoulders 154, 156. The elastic nature of the plastic allows a user to urge the coupling members together without adverse consequences.

Figure 19:
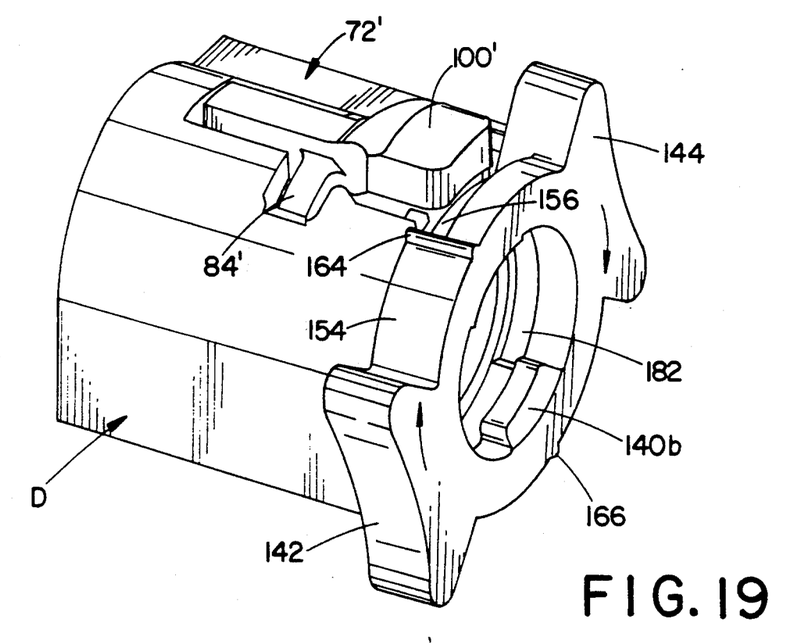
FIG. 19 is another perspective substantially similar to FIG. 17 but illustrating the lock ring in the unlocked, second position.

On the other hand, once the coupling assembly is made up, i.e., the male and female coupling members are disposed in coupled relation (FIG. 14), the coupling members cannot be separated until the lock ring is rotated to its unlocked or release position (FIG. 16, 19). The contour of the latching tabs and receipt in the associated grooves 46' prevent normal pull out forces from separating the coupled male and female coupling members until radial depression of the actuating portions is permitted by rotating the lock ring to its release position. In that manner, the latching members pivot about respective central portions and the tabs are radially positioned outward of the groove to permit decoupling of the assembly.

The invention has been described with reference to the preferred embodiment. Obviously modifications and alterations will occur to others upon a reading and understanding of the specification. It is intended to include all such modifications and alterations insofar as they come within the scope of the appended claims or the equivalents thereof.

Having thus described the invention, it is now claimed:

1. A coupling assembly for selectively joining first and second fluid lines together from an uncoupled relation to a coupled relation, the coupling assembly comprising:
   a first coupling member having an opening therethrough, a first end adapted for connection to a first fluid line and a groove defined on an external surface thereof;
   a second coupling member having an opening therethrough a first end adapted for connection to a second fluid line and a groove defined on an external surface thereof;
   a sleeve member having a radially inward extending should received in one of the grooves of the first and second coupling members, the sleeve including a latching member pivotally secured thereto with a tab extending therefrom and dimensioned for selective receipt in the other of the grooves of the first and second coupling members when the first coupling members are in coupled relation; and,
   a ring secured to one of the first and second coupling members by securing means for movement between first and second positions, the ring having a surface that inhibits pivotal movement of the latching member in the first position to maintain the first and second coupling members in coupled relation and the ring permitting pivotal movement of the latching member in the second position to allow the first and second coupling members to uncouple.

2. The coupling assembly as defined in claim 1 wherein the ring is circumferentially continuous.

3. The coupling assembly as defined in claim 1 further comprising first and second stop members on the ring positively defining the first and second positions, the stop members each having a surface for engaging the latching member and preventing rotational movement in one direction of the ring relative to the one of the first and second coupling members.

4. The coupling assembly as defined in claim 1 further comprising an additional groove on one of the first and second coupling members, the ring being at least partially received in the additional groove for selective rotational movement relative thereto between the first and second positions.

5. The coupling assembly as defined in claim 1 further comprising a first and second radially spaced surfaces on the ring, the first surface being disposed adjacent the latching member in the first position for allowing pivotal movement of the latching member to connect and disconnect the first and second coupling members and the second surface being disposed adjacent the latching member in the second position for inhibiting movement of the latching member and maintain the first and second coupling members in couled relation.

6. The coupling assembly as defined in claim 5 wherein the first and second surfaces are circumferentially contiguous.

7. The coupling assembly as defined in claim 1 wherein the ring includes at least one enlarged finger engaging region that facilitates movement of the ring between the first and second positions.

8. The coupling assembly for selectively coupling first and second fluid lines together, the coupling assembly comprising:
a first coupling member having an opening extending therethrough, the first coupling member adapted to be connected to a first fluid line at one end and having a circumferential groove defined no an external surface;
a second coupling member having an opening extending therethrough, the second coupling member adapted to be selectively connected to a second fluid line at one end and having a circumferential groove defined on an external surface, the second coupling member being selectively coupled to the first coupling member;
a cylindrical sleeve member being substantially circumferentially continuous at one end thereof, a radially inward extending shoulder being defined at the other end for receipt in one of the grooves defined on the first and second members, the sleeve including a latching member having a first end, an intermediate central position, and a second end, the latching member including a tab being dimensioned for selective receipt in the other one of the grooves of the first and second members when the shoulder is received in the one groove, the latching member having means for securing the latching member to the sleeve and pivoting the first and second ends thereof about an intermediate central portion by depressing an actuating portion defined at the first end of the latching member; and,
means for selectively retaining the first and second coupling members in coupled relation, the retaining means being operatively connected with one of the first and second coupling members, the retaining means including means for precluding pivotal movement of the latching member about the intermediate central portion.

9. The coupling assembly as defined in claim 8 wherein the retaining means includes means for precluding pivotal movement of the latching member about the intermediate central portion.

10. The coupling assembly as defined in claim 8 wherein the precluding means includes a ring received in another groove defined on one of the first and second coupling members, and a shoulder defined on the ring adapted for interfering relation with one end of the latching member.

11. The coupling assembly as defined in claim 10 wherein the ring selectively rotates in the another groove for positioning the shoulder beneath one end of the latching member.

12. The coupling assembly as defined in claim 11 wherein the tab is located at the second end of the latching member and the shoulder is selectively positioned beneath the first end of the latching member.

13. The coupling assembly as defined in claim 8 wherein the tab and the second coupling member include cooperating surfaces that permit make-up of the first and second coupling members from an uncoupled relation to a coupled relation when the shoulder is selectively positioned beneath the first end of the latching member.

14. A coupling assembly adapted to connect first and second associated fluid lines together, the coupling assembly comprising:
first and second coupling members having openings therethrough for passage of fluid when connected with the associated fluid lines and selective coupled engagement with one another, the second coupling member including an external groove and the first coupling member including first and second spaced external grooves;
a substantially circumferentially continuous sleeve having an opening therethrough and including means for fixedly securing the sleeve to the first coupling member first groove and for selectively securing to the second coupling member, the sleeve being formed entirely from a plastics material and having an integral latching means for coupling the first and second coupling members together, the latching means including a latching member having opposite ends and a central portion, said one end including a tab that extends radially inward in a first position for engagement with the groove in said second coupling member and is movable to a second, radially outer position by pivoting the latching member about a central portion through radial movement of an actuating portion defined at the end opposite said one end of the latching member, the central portion being adapted for pivoting action through use of longitudinally and circumferentially extending pairs of slots in said sleeve adjacent the latching member that place circumferential strips interposed between the circumferential slots under twisting forces when the tab is urged toward the second position; and,
means for retaining the first and second coupling members in coupled relation, the retaining means being secured to the first coupling member via the second groove thereof.

15. The coupling assembly as defined in claim 14 wherein the retaining means includes a surface selectively positioned for precluding pivotal movement of the latching member.

16. The coupling assembly as defined in claim 15 wherein the precluding means prevents pivotal movement of the actuating portion of the latching member.

17. The coupling assembly as defined in claim 15 wherein the retaining means includes enlarged finger engaging projections that facilitate selective rotational movement of the retaining means to position the surface adjacent to and preclude pivotal movement of the latching member in a first position and permit pivot movement of the latching member when the surface is disposed in a second position spaced from the latching member.

18. The coupling assembly as defined in claim 17 wherein the retaining means includes detent means to provide positive indication of the movement of the retaining means between said first and second positions.

19. The coupling assembly as defined in claim 1 further comprising sealing means on one of the first and second coupling members for sealing engagement with the other of the first and second coupling members when positioned in coupled relation.

20. The coupling assembly as defined in claim 8 further comprising seal means secured to one of the first and second coupling members and adapted for sealing engagement with the other of the first and second coupling members when coupled together.

* * * * *